US010960718B2

(12) United States Patent
McCoy et al.

(10) Patent No.: US 10,960,718 B2
(45) Date of Patent: Mar. 30, 2021

(54) WEIGHT DISTRIBUTION SYSTEM

(71) Applicant: HORIZON GLOBAL AMERICAS INC., Plymouth, MI (US)

(72) Inventors: Richard W. McCoy, Granger, IN (US); Marvin Hanson, Edwardsburg, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 255 days.

(21) Appl. No.: 16/253,384

(22) Filed: Jan. 22, 2019

(65) Prior Publication Data
US 2019/0152280 A1 May 23, 2019

Related U.S. Application Data

(63) Continuation of application No. 13/834,043, filed on Mar. 15, 2013, now Pat. No. 10,183,536.

(51) Int. Cl.
*B60D 1/24* (2006.01)
*B60D 1/06* (2006.01)

(52) U.S. Cl.
CPC ........... *B60D 1/247* (2013.01); *B60D 1/06* (2013.01)

(58) Field of Classification Search
CPC . B60D 1/06; B60D 1/247; B60D 1/24; B62D 53/068
USPC ............................ 280/405.1, 455.1, 187, 511
See application file for complete search history.

(56) References Cited

U.S. PATENT DOCUMENTS

| 721,281 A | 2/1903 | Broyles |
|---|---|---|
| 2,402,393 A | 6/1946 | Griffith |
| D148,269 S | 1/1948 | Askins |
| 2,666,654 A | 11/1954 | Gray |
| 2,709,604 A | 5/1955 | Hartman |
| 2,729,467 A | 1/1956 | Reese |
| 2,738,206 A | 3/1956 | Loughner |
| 2,783,775 A | 3/1957 | Fullwood |
| 2,789,834 A | 4/1957 | Chism |
| 2,808,272 A | 10/1957 | Reese |
| 2,817,541 A | 12/1957 | Mathisen |
| 2,952,475 A | 9/1960 | Reese |
| 3,021,154 A | 2/1962 | Hedgepeth |
| 3,151,879 A | 10/1964 | Bock |
| 3,185,499 A | 5/1965 | Reese |
| 3,194,584 A | 7/1965 | Reese |
| 3,206,224 A | 9/1965 | Bock et al. |
| 3,220,749 A | 11/1965 | Mathisen |
| 3,226,999 A | 1/1966 | Allison |
| 3,294,421 A | 12/1966 | Mathisen |
| 3,347,561 A | 10/1967 | Hedgepeth |

(Continued)

FOREIGN PATENT DOCUMENTS

CA 2607306 4/2008

*Primary Examiner* — Kevin Hurley
*Assistant Examiner* — Felicia L. Brittman
(74) *Attorney, Agent, or Firm* — McDonald Hopkins LLC

(57) ABSTRACT

A weight distribution system is shown and described. The weight distribution system may include a spring arm configured to be operatively engaged between plate members of a ball mount, and a pin member inserted into the spring arm, the pin member configured to secure the spring arm with the ball mount. The weight distribution system may also include an attachment mechanism configured to selectively place the spring arm in mechanical communication with a towed vehicle.

20 Claims, 4 Drawing Sheets

(56) References Cited

U.S. PATENT DOCUMENTS

| | | | |
|---|---|---|---|
| 3,353,942 A | 11/1967 | Lewis | |
| 3,359,824 A | 12/1967 | Focht | |
| 3,380,757 A | 4/1968 | Sprout et al. | |
| 3,400,948 A | 9/1968 | Matson | |
| 3,403,928 A | 10/1968 | Laughlin | |
| 3,420,549 A | 1/1969 | Robinson | |
| 3,441,291 A | 4/1969 | Morris, Jr. | |
| 3,445,125 A | 5/1969 | Stewart | |
| 3,482,856 A | 12/1969 | Reese | |
| 3,482,859 A | 12/1969 | Bowlin | |
| 3,490,788 A | 1/1970 | Mann | |
| 3,520,556 A | 7/1970 | Warner | |
| 3,542,394 A | 11/1970 | Palage | |
| 3,542,395 A | 11/1970 | Millikan | |
| 3,552,771 A | 1/1971 | Hendricks | |
| 3,567,251 A | 3/1971 | Dalton | |
| 3,588,145 A | 6/1971 | Thompson | |
| 3,600,004 A | 8/1971 | Newkirk | |
| 3,633,939 A | 1/1972 | Evernham et al. | |
| 3,649,046 A | 3/1972 | Mathisen | |
| 3,655,221 A | 4/1972 | Warner | |
| 3,679,231 A | 7/1972 | Derr, Jr. | |
| 3,717,364 A | 2/1973 | McClive | |
| 3,722,920 A | 3/1973 | Reese | |
| 3,730,554 A | 5/1973 | Saunders | |
| 3,731,950 A | 5/1973 | Burcham | |
| 3,751,069 A | 8/1973 | Suckrow | |
| 3,756,618 A | 9/1973 | Lewis | |
| 3,778,088 A | 12/1973 | Alexander | |
| 3,779,407 A | 12/1973 | Gillem | |
| 3,784,036 A | 1/1974 | Gjoerloff | |
| 3,785,680 A | 1/1974 | Good et al. | |
| 3,787,069 A | 1/1974 | Chauncey | |
| 3,801,133 A | 4/1974 | Thompson | |
| 3,814,463 A | 6/1974 | Tunesi | |
| 3,861,717 A | 1/1975 | Knox | |
| 3,879,061 A | 4/1975 | Thompson | |
| 3,900,212 A | 8/1975 | Ewing | |
| 3,989,269 A | 11/1976 | Rendessy | |
| 4,033,601 A | 7/1977 | Lindahl et al. | |
| 4,049,288 A | 9/1977 | Young | |
| 4,053,174 A | 10/1977 | Guettler, Jr. | |
| 4,092,035 A | 5/1978 | Warner | |
| 4,154,454 A | 5/1979 | Lewin | |
| 4,165,885 A | 8/1979 | Good et al. | |
| 4,198,073 A | 4/1980 | Olsen | |
| 4,202,562 A | 5/1980 | Sorenson | |
| 4,211,427 A | 7/1980 | Young et al. | |
| 4,213,627 A | 7/1980 | Thompson | |
| 4,230,333 A | 10/1980 | Persyn | |
| 4,253,680 A | 3/1981 | Albright et al. | |
| 4,278,267 A | 7/1981 | Vasseur | |
| 4,306,734 A | 12/1981 | Swanson et al. | |
| 4,312,516 A | 1/1982 | Olsen | |
| 4,402,523 A | 9/1983 | Knowles | |
| 4,405,147 A | 9/1983 | Horsman et al. | |
| 4,614,353 A | 9/1986 | Meyer | |
| 4,679,812 A | 7/1987 | Byrnes | |
| 4,722,542 A | 2/1988 | Hensley | |
| D296,886 S | 7/1988 | Young, Jr. | |
| 4,792,151 A | 12/1988 | Feld | |
| 4,815,752 A | 3/1989 | Young et al. | |
| 5,222,754 A | 6/1993 | Few | |
| 5,375,867 A | 12/1994 | Kass et al. | |
| 5,415,516 A | 5/1995 | Richards | |
| 5,465,991 A | 11/1995 | Kass et al. | |
| 5,509,681 A | 4/1996 | Keller | |
| 5,516,140 A | 5/1996 | Hinte | |
| 5,562,298 A | 10/1996 | Kass et al. | |
| 5,566,965 A | 10/1996 | Applegate | |
| D375,284 S | 11/1996 | Kass et al. | |
| 5,580,076 A | 12/1996 | DeRoule et al. | |
| 5,628,525 A | 5/1997 | Kass et al. | |
| 5,647,603 A | 7/1997 | Kass et al. | |
| D382,464 S | 8/1997 | McCoy et al. | |
| 5,725,231 A | 3/1998 | Buie | |
| 5,799,965 A | 9/1998 | Kass et al. | |
| 5,868,414 A | 2/1999 | McCoy et al. | |
| 5,873,594 A | 2/1999 | McCoy et al. | |
| 5,890,726 A | 4/1999 | McCoy et al. | |
| 5,984,341 A | 11/1999 | Kass et al. | |
| D418,094 S | 12/1999 | Schmidt et al. | |
| 6,045,147 A | 4/2000 | Schmidt et al. | |
| 6,182,997 B1 | 2/2001 | Ullrich et al. | |
| 6,283,489 B1 | 9/2001 | Hoog | |
| 6,419,257 B1 | 7/2002 | McCoy et al. | |
| 6,536,793 B2 | 3/2003 | Sargent | |
| 6,594,924 B2 | 7/2003 | Curtis | |
| 6,629,701 B1 | 10/2003 | Colbert | |
| 6,722,682 B2 | 4/2004 | Valliere et al. | |
| 6,746,036 B2 | 6/2004 | Adams | |
| 6,860,501 B2 | 3/2005 | Schmidt et al. | |
| 7,025,370 B2 | 4/2006 | Anderson et al. | |
| 7,029,020 B2 | 4/2006 | Adams | |
| 7,934,742 B2 | 5/2011 | Anderson et al. | |
| 7,967,320 B2 | 6/2011 | Anderson et al. | |
| 8,186,702 B2 | 5/2012 | McCoy et al. | |
| 8,641,075 B1* | 2/2014 | Angel | B60D 1/06 280/455.1 |
| 2003/0042703 A1 | 3/2003 | Valliere et al. | |
| 2006/0049612 A1 | 3/2006 | Anderson et al. | |
| 2008/0122198 A1 | 5/2008 | Anderson | |
| 2008/0143078 A1 | 6/2008 | McCoy et al. | |
| 2008/0238038 A1 | 10/2008 | Anderson et al. | |
| 2008/0277903 A1 | 11/2008 | Anderson et al. | |
| 2009/0008904 A1 | 1/2009 | Scott | |

* cited by examiner

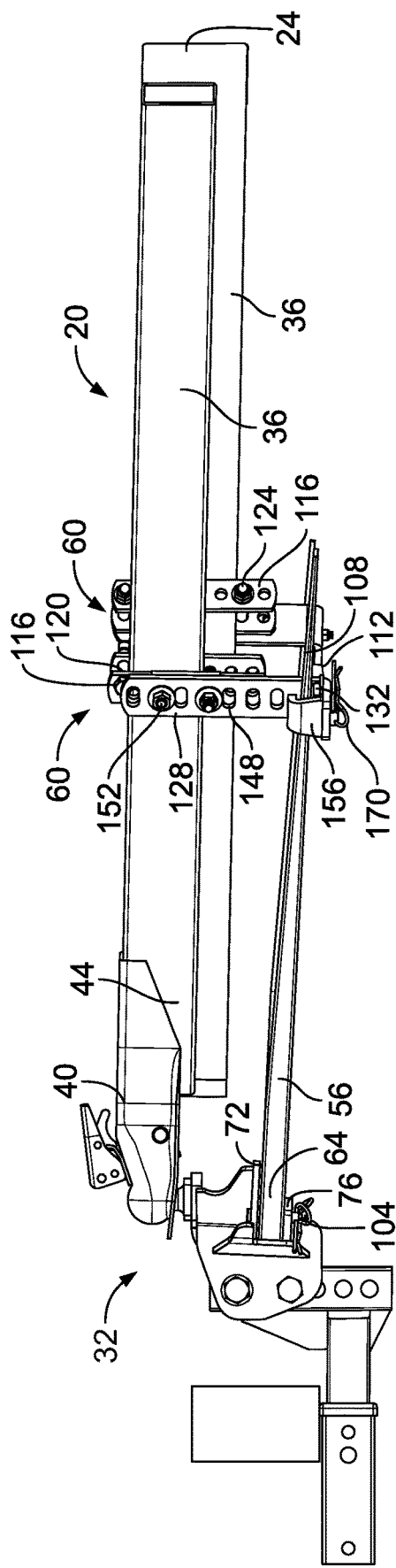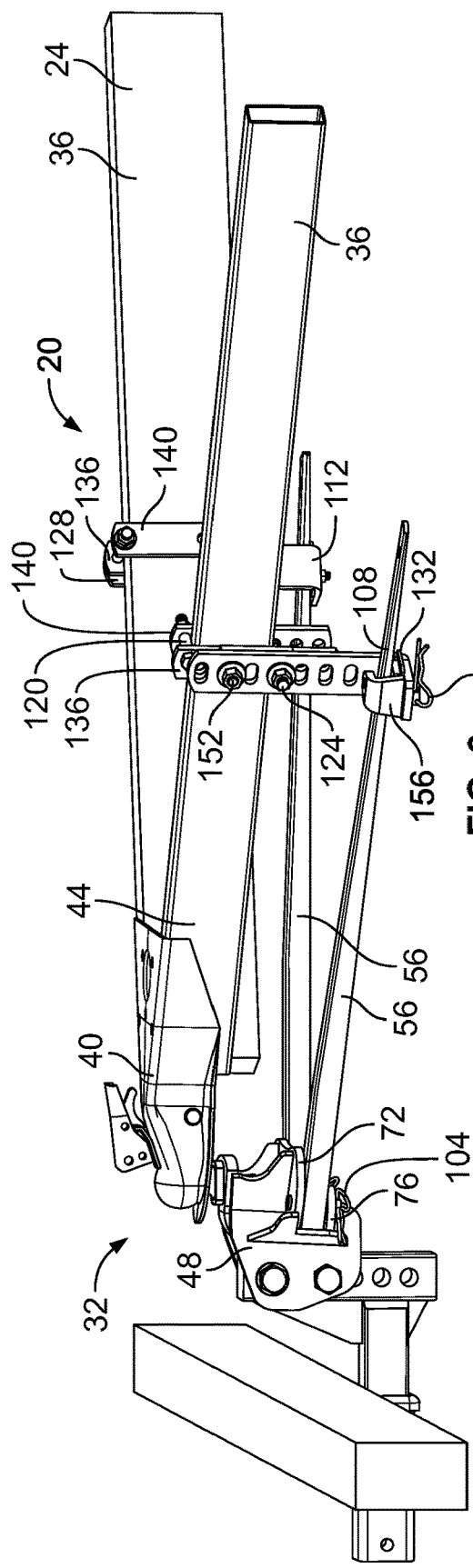

WEIGHT DISTRIBUTION SYSTEM

CROSS-REFERENCE TO RELATED APPLICATION

This application is a continuation of U.S. patent application Ser. No. 13/834,043, filed on Mar. 15, 2013, and entitled, "WEIGHT DISTRIBUTION SYSTEM," the entirety of which is incorporated herein by reference.

FIELD OF INVENTION

The present invention relates generally to a weight distribution system, and; more specifically, the present invention relates to a system of distributing weight of a towed vehicle to a towing vehicle and controlling sway of the towed vehicle relative to the towing vehicle.

BACKGROUND

Many vehicles are designed to transport freight, goods, merchandise, personal property, and other such cargo. Often, such vehicles are arranged to tow a towed vehicle, such as a trailer by attaching the towed vehicle to the towing vehicle though the use of a hitch assembly. For example, a hitch assembly may attach a trailer to a towing vehicle through a hitch ball and coupler arrangement that allows relative movement between the towing vehicle and the trailer as the towing vehicle makes turns, traverses uneven or rough terrain, and passes along inclining and declining roadways.

Even distribution of the weight of a towed vehicle among the axles of the towing vehicle is important to the effective operation of a towing vehicle that is towing the towed vehicle. Towed vehicles are often loaded with heavy cargo and may substantially outweigh the towing vehicle. When such a towed vehicle is coupled or secured to the rear of a towing vehicle, the majority of the weight of the towed vehicle may be born by the rear axle of a towing vehicle. Such uneven weight distribution may lower the rear of the towing vehicle and raise the front of the towing vehicle. Under such conditions, the tires of the rear axle may bear substantially more weight than the tires of the front axle of the towing vehicle.

Controlling the sway movement of the towed vehicle (i.e., lateral or side-to-side movement of the trailer with respect to the towing vehicle) relative to the towing vehicle as the trailer is towed is also important to the effective operation of a towing vehicle. While relative motion of the trailer with respect to the towing vehicle is necessary to accommodate turns and inclining and declining roadways, excess sway of the towed vehicle may be undesirable. This may be particularly true when the load that is being towed is heavy relative to the weight of the towing vehicle.

Many factors may contribute to the swaying of a towed vehicle. For example, crosswinds impacting the trailer; unevenly loaded towed vehicles; inclined, declined, and sloped roadways; winding roadways; and rough and uneven terrain may all contribute to swaying of the towed vehicle. Such factors may be exacerbated as the speed of the vehicle increases. As previously mentioned, towed vehicles and cargo may substantially outweigh a towing vehicle. When such a towed vehicle begins to sway, particularly when driven at high speeds such as on a highway, the towed vehicle may transfer sufficient side-to-side and lateral forces to the towing vehicle to cause undesirable driving conditions.

Weight distributing systems, with sway dampening; have been used to remedy these conditions. However, attaching such weight distribution systems can often be time consuming and difficult. Further still, these weight distributing system use spring bars of a square shape requiring use an intermediate part to fasten the spring bar into the ballmount. Typically this has been accomplished with trunnions and tubular bushings. This approach, however, leads to extra parts. These extra parts add weight to the system, increase looseness, increases costs and provide additional wear items requiring replacement.

There is a need, therefore, for a weight distributing system with sway dampening that uses fewer parts, weighs less than other systems, and is easier to operate. There is also need for a weight distributing system that easier and quicker to assemble.

SUMMARY OF INVENTION

A weight distribution system is shown and described. The weight distribution system may include a spring arm configured to be operatively engaged between plate members of a ball mount, and a pin member inserted into the spring arm, the pin member configured to secure the spring arm with the ball mount. The weight distribution system may also include an attachment mechanism configured to selectively place the spring arm in mechanical communication with a towed vehicle.

A weight distribution system may include a ball mount adapted to be mounted to a hitch of a towing vehicle, a spring arm operatively inserted into the ball mount, and a pin inserted into the spring arm and the ball mount, the pin member operatively securing the spring arm directly with the ball mount. The weight distribution system may also include an attachment mechanism configured to selectively place the spring arm in mechanical communication with a towed vehicle.

A weight distribution system may include a ball mount adapted to be mounted to a hitch of a towing vehicle, the ball mount including first and second plate members, a spring arm operatively engaged between the first and second plate members, and a pin inserted into the spring arm and the first and second plate members, the pin member operatively securing the spring arm with the ball mount. The weight distribution system may also include an attachment mechanism selectively placing the spring arm in mechanical communication with a towed vehicle.

DESCRIPTION OF THE DRAWINGS

Operation of the invention may be better understood by reference to the detailed description taken in connection with the following illustrations, wherein

FIG. 2 is a side view of the weight distribution and sway control system.

FIG. 3 is a side perspective view of the weight distribution and sway control system.

DETAILED DESCRIPTION OF THE INVENTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
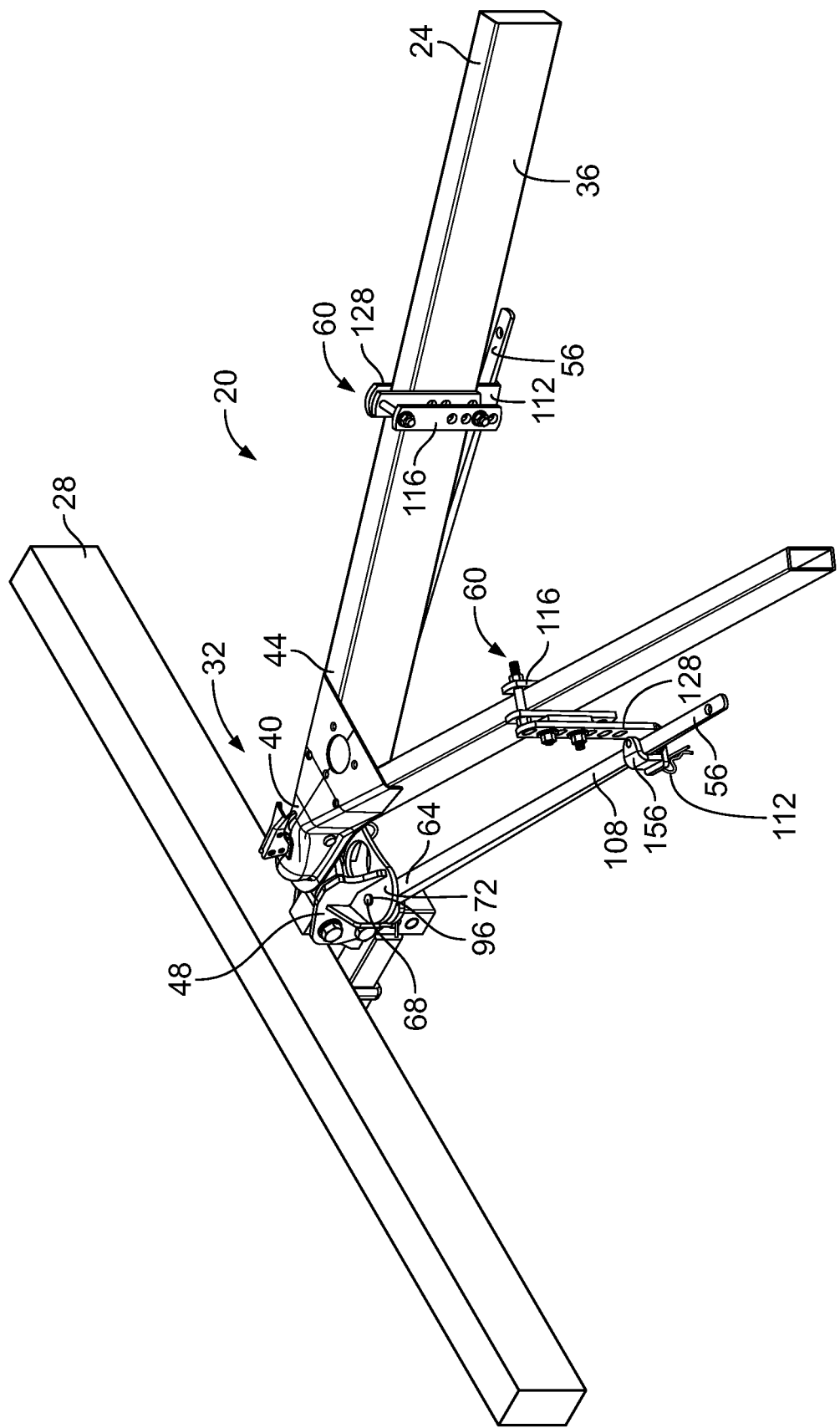
FIG. 1 is a top perspective view of embodiments of a weight distribution and sway control system.
Figure 4:
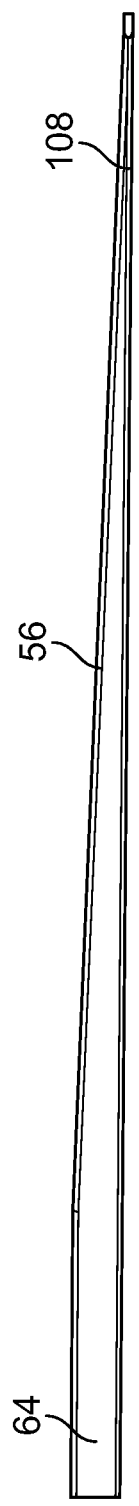
FIG. 4 is a side view of a portion of the weight distribution and sway control system.
Figure 5:
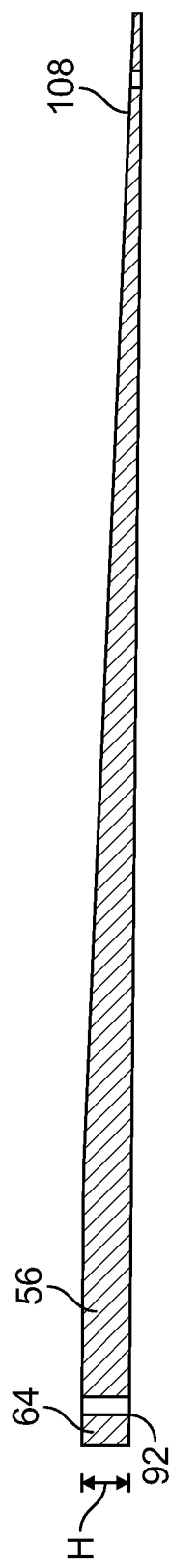
FIG. 5 is a cross-sectional view of a spring arm of the weight distribution and sway control system.
Figure 6:
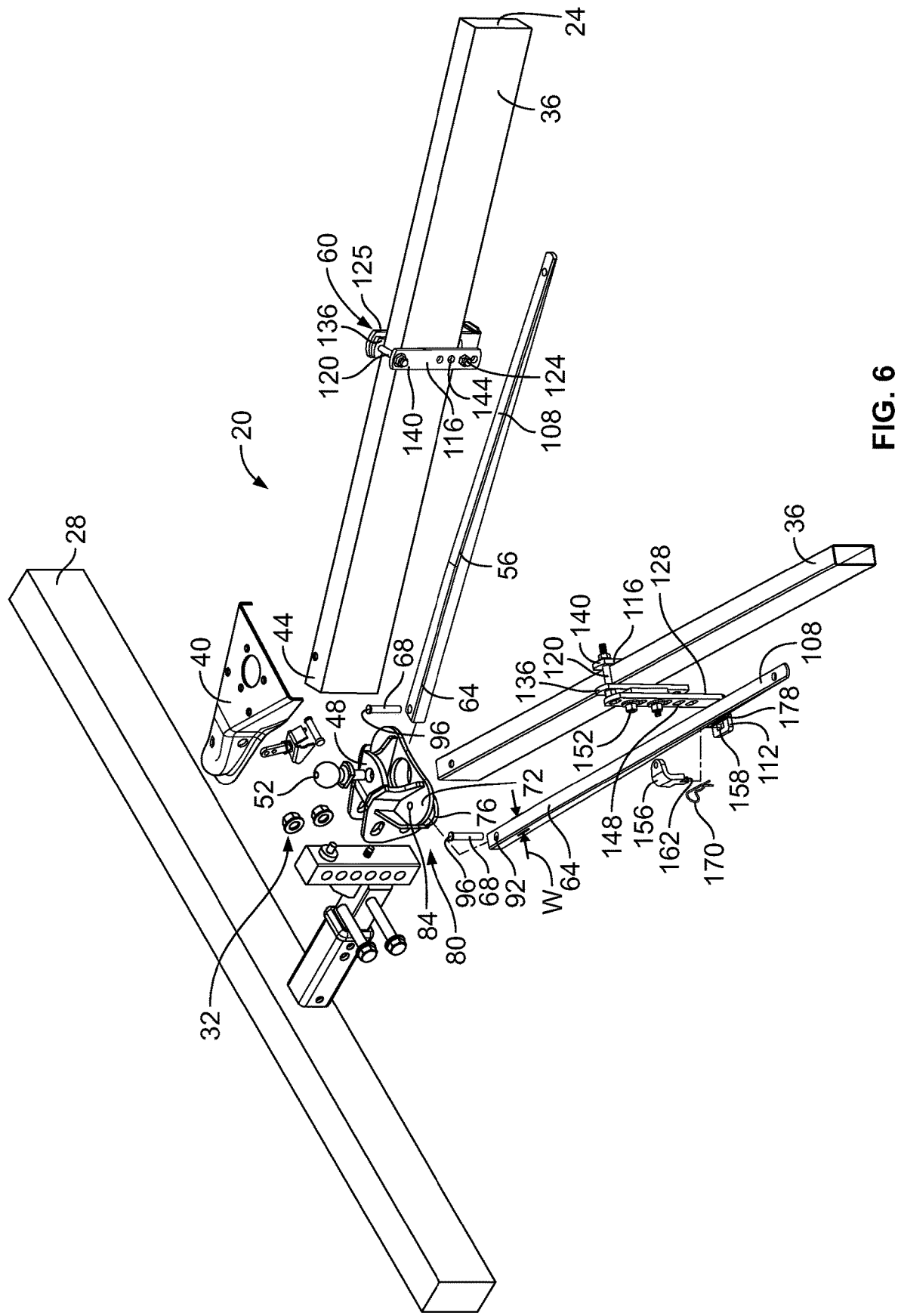
FIG. 6 is an exploded view of a portion of the weight distribution and sway control system.

FIGS. 1 through 6 illustrate an exemplary embodiment of a hitch assembly 20 for distributing weight and controlling sway of a towed vehicle 24 attached to a towing vehicle 28, a portion of which is shown in FIG. 1. The towed vehicle 24 may be coupled, attached, or otherwise secured to the towing vehicle 28 through in any appropriate manner. By way of a non-limiting example, a hitch ball and coupler arrangement 32 may be utilized.

As shown in FIGS. 1 and 2, the towed vehicle 24 may include an A-frame member 36, with a coupler 40 attached to a front end 44 of the A-frame member 36. A ball mount head 48 may be attached to the towing vehicle 28 in any appropriate manner. The ball mount head 48 may includes a hitch ball 52 secured thereto. In such embodiments, the coupler 40 may be positioned over the hitch ball 52 and secured with the hitch ball 52, thus securing the towed vehicle 24 to the towing vehicle 28. It should be understood, however, that the towed vehicle 24 may be secured with the towing vehicle 28 in any appropriate manner and is not limited to that shown and described herein.

The exemplary hitch assembly 20 as illustrated and described may provide additional linkages between the A-frame member 36 of the towed vehicle 24 and the ball mount head 48. This arrangement may allow for distribution of weight of the towed vehicle 24 and may control sway of the towed vehicle 24.

The hitch assembly 20 may also include a pair of spring arms 56. The pair of spring arms 56 may be substantially similar to one another; however the present teachings are not limited to such. Only one reference number will be used for the pair of spring arms 56, and any illustration or description of a spring arm 56 will apply to either spring arm 56. The spring arms 56 may have a generally rectangular cross-sectional shape, such that the width W may be greater than the height H thereof. This may result in the spring arm 56 being lighter than other prior art systems, while generally maintaining the same performance. By way of a non-limiting example, the height H of the spring arm 56 may be less than other systems, which may result in the spring arms 56 being generally lighter.

The hitch assembly 20 may further include a pair of attachment assemblies 60. The pair of attachment assemblies or mechanisms 60 may be substantially similar; however, the present teachings are not limited to such. In some embodiments, the pair of attachment assemblies 60 may of a different configuration. For purposes of this disclosure, only one reference number will be used for the pair of attachment assemblies 60, and any illustration or description of an attachment assembly 60 will apply to either attachment assembly 60. Although an exemplary embodiment is illustrated and described herein as having a pair of spring arms 56 and a pair of attachment assemblies 60, it will be readily understood by those skilled in the art that a hitch assembly 20 may include greater of fewer than two spring arms 56 and greater than or fewer than two attachment assemblies 60 to attach those spring arms 56 to a towed vehicle 24.

A first end 64 of the spring arm 56 may be operatively coupled directly to the ball mount head 48, such as through the use of a fastener 68. The configuration of the spring arm 56 may make it unnecessary to use a tubular member and mounting trunnion used by other prior art systems. In such embodiments, the ball mount head 48 may include a first and second plate members 72, 76 axially spaced from each other such that a space 80 is formed therebetween. The spring arm 56 may be configured to generally fit between the first and second plate members 72, 76, i.e., the spring arm 56 may be configured to operatively fit within the space 80. The height H of the spring arm 56 may permit it to fit within the space 80. This may result in high loads within the ball mount head 48. In some embodiments, the fit between the spring arm 56 and the first and second plate members 72, 76 may be tight, which may create large frictional load in the ball mount 48. This large frictional load may provide more sway dampening to the hitch assembly 20.

Each of the first and second plate members 72, 76 may include an aperture 84. In such embodiments, the spring arm 56 may also include an aperture 92. The aperture 92 may extend through the height H of the spring arm 56. The spring arm 56 may be positioned between the first and second plate members 72, 76, and the apertures 84 may be generally aligned with the aperture 92 of the spring arm 56. Once aligned, the 68 fastener of any appropriate configuration, such as a pin shown in the drawings may be inserted through the apertures 84, 92. This may result in the spring arm 56 being operatively coupled with the ball mount head 48 with the pin 68 being vertically positioned through the mount head 48 and spring arm 56. In some embodiments, this may result in the spring arm 56 being pivotally and operatively coupled with the ball mount head 48.

The fastener 68 may include a head 96 that may engage the first plate member 72. The head 96 may be sized to generally prevent the entire fastener 68 from passing into or through the aperture 84. Distally spaced from the head 96 of the fasteners, an aperture 100 may be positioned within the fastener 68. The aperture 100 may be of any appropriate configuration. In some embodiments, a second fastener 104, such as the clip shown, may be inserted into the aperture 100 and engaged with the fastener 68. The clip 104 may generally prevent the fastener 68 from entering into or through the aperture of the second plate member 76. This may generally keep the spring arm 56 operatively coupled with the ball mount head 48.

Utilizing the fastener 68 and directly attaching the spring arm 56 with the first and second plate members 72, 76 may result in the hitch assembly 20 having fewer components, while also be tightly fit together. With fewer components, the hitch assembly 20 may undergo less wear than other prior art systems and may result in the hitch assembly 20 being operatively fitting tighter together. Still further, having fewer components may result in the hitch assembly 20 being lighter than other prior art systems. Any one of these or a combination of such may result in the hitch assembly 20 having an extended life. Moreover, using the clip 104 and the fastener 68 to secure the spring arm 56 with the ball mount head 48 may permit the spring arm 56 to be readily removed from the ball mount head 48 when not needed.

In some embodiments, the vertical positioning of the fastener or pin 68 to attach the spring arm 56 with the ball mount head 48 may provide a spring arm pivot point. This pivot point may use fewer components to secure the spring arm 56 with the ball mount head 48. Most other systems use an intermediate piece, such as a trunnion with a horizontal pin or a bushing with a horizontal connecting pin, to connect the spring arm assembly to the ball mount. The present hitch assembly 20 does not use the intermediate piece and the pin 68 is vertically attached.

The attachment assembly 60 may selectively attach, couple, or otherwise secure a second or opposite end 108 of the spring arm 56 to the A-frame 36 of the towed vehicle 24. As best seen in FIG. 1, the attachment assembly 60 may include a shoe bracket 112, a frame bracket 116 with top and bottom pins 120, 124, a side bracket 128, and a friction pad 132. As will be described in detail below, the attachment assembly 60 may selectively attach or couple the spring arm 56 to the towed vehicle 24. This may result in the spring arm 56 assisting with distributing the weight of the towed vehicle 24 to and with the towing vehicle 28 and generally controlling the sway of the towed vehicle 24 relative to the towing vehicle 28. In addition, the spring arm 56 may be attached or coupled to the towed vehicle 24 such that this attachment may allow the towed vehicle 24 to move laterally with respect to the towing vehicle 28 so as to accommodate operations such as turning the towing vehicle 28 to the left and right. By way of a non-limiting example, the fastener 68 may permit the spring arm 56 to be pivotally attached with the ball mount head 48. This arrangement, however, may also provide sufficient sway force resistance to generally dampen or generally eliminate sway as the towing vehicle 28 tows the towed vehicle 24.

It should be appreciated that selectively attaching or coupling the spring arm 56 to the towed vehicle 28 with the attachment assembly 60 may be accomplished through the transfer of force between the components. By way of a non-limiting example, the spring arm 56 may be coupled to the towed vehicle 24 by the spring arm 56 applying a force to the towed vehicle 24 through the attachment mechanism 60. Such a force may be arranged to keep the spring arm 56 in general contact with, and thus attached to, the attachment mechanism 60 throughout the operation of the towing vehicle 28. In other words, the spring arm 56 may be in mechanical contact with the towed vehicle 24 through the attachment mechanism 60 throughout the operation of the towing vehicle 28. In other embodiments, a force may be arranged to keep the spring arm 56 generally in contact with the attachment mechanism 60 throughout certain operations of the towing vehicle 28 and may allow the spring arm 56 to break contact with the attachment mechanism 60 throughout other operations of the towing vehicle 28. In other words, the spring arm 56 may selectively be in mechanical contact with the towed vehicle 24 through the attachment mechanism 60 throughout the operation of the towing vehicle 28.

In such embodiments, the attachment mechanism 60 may include the frame bracket 116, which may include two vertically extending bracket members 136, 140. Although the frame bracket 116 is shown as a coupling of two components, it will be readily understood by those skilled in the art that the frame bracket 116 may be monolithically formed. The two vertically extending brackets members 136, 140 may, in some embodiments, be of substantially the same configuration. However, the present teachings are not limited to such; the two vertically extending bracket members 136, 140 may also be of different construction from one another.

The two vertically extending bracket members 136, 140 may include at least one aperture 144 that may be sized to accept the top and bottom pins 120, 124. The top and bottom pins 120, 124 may be of any appropriate construction. By way of a non-limiting example, the top and bottom pins 120, 124 may be a fastener, such as a bolt, rivet, or the like. In some embodiments, the two vertically extending bracket members 136, 140 may include a series of apertures 144 or a plurality of apertures 144 that may also be sized to accept a fastener, such as a bolt, rivet, or the like, including, without limitation the top and bottom pins 120, 124.

The side bracket 128 may include a series of apertures 148 sized to accommodate a fastener, such as a bolt, rivet, or the like, and may be arranged such that at least one aperture 148 of the side bracket 128 mates or generally aligns with at least on of the apertures 144 of the frame bracket 116. Fasteners may be passed through mated apertures 144, 148 to couple the frame bracket 116 and side bracket 128 together. By way of a non-limiting example, the bottom pin 124 may be inserted through the mated apertures 144, 148. In some embodiments, a fastener 152 may be inserted into and through mated apertures 144, 148 of the frame bracket 116 and the side bracket 128 and may extend into the A-frame 36.

The shoe bracket 112 may be attached with the side bracket 128 in any appropriate manner. By way of non-limiting examples, the side bracket 128 may be monolithically formed with the shoe bracket 112, or the shoe bracket 112 may be attached with the side bracket 128 such as through welding, fastening or otherwise adhering.

In some embodiments, the shoe bracket 112 may include a generally L-shaped member 156. The L-shaped member 156 may be monolithically formed with the shoe bracket 112 or may be attached thereto such as through welding, fastening, adhering or the like. By way of a non-limiting example, the shoe bracket 112 may include an aperture 158 and the L-shaped member 156 may include a tab 162 sized and shaped to be inserted into and through the aperture 158. The tab 162 may include an aperture 166 through which a clip 170 may be inserted to secure L-shaped member 156 with the shoe bracket 112. The L-shaped member 156 being attached with the shoe bracket 112 may generally form a cavity 174 into which or through which the spring arm 56, or more specifically, the second end 108 may engage. In such embodiments, the L-shaped member 156 may be selectively attached with the shoe bracket 112. This may simplify the engagement of the spring arm 56 with the shoe bracket 112. In such embodiments, the clip 170 may be removed from the aperture 158 of the L-shaped member 156. The L-shaped member 156 may then be removed from the aperture 158 of the shoe bracket 112. This may provide easy access for the spring arm 56 to be engaged with the shoe bracket 112. Once the spring arm 56, i.e., the second end 108 is engaged with the shoe bracket 112, the L-shaped member 156 may then be attached to the shoe bracket 112. This may form the cavity 174 in which the spring arm 56 may be positioned.

The friction pad 132 may be positioned or coupled to a flat inner surface 178 of the shoe bracket 112. The friction pad 132 as illustrated may be comprised of any appropriate material that may generally resist movement of components in contact with the friction pad 132 including, without limitation automotive composites and other high friction materials.

In some embodiments, the attachment assembly 60 may be attached to the A-frame member 36 of the towed vehicle 24 as follows: The frame bracket 116, or more specifically, the vertically extending bracket members 136, 140 may be placed on either side of the A-frame member 36. The top pin member 120 may be inserted into the corresponding apertures 144. The side bracket 128 may then be aligned appropriately with respect to the frame bracket 116. The series of apertures 144, 148, respectively, may allow for the assembly 60 to be attached to A-frame members 36 of varying heights. The fastener 152 may be inserted into one of the series of apertures 148 of the side bracket 128 and one of the vertically extending bracket members 136 (or 140) and into the A-frame 36. The side bracket 116 may be positioned relative to the A-frame 36 and the frame bracket 116 such that the shoe bracket 112 is appropriately positioned relative to the spring arm 56.

Such an arrangement may allow for variation of the height of the shoe bracket 112 by enabling an operator or installer to selectively choose to align the apertures 148 of the side bracket 128 with higher or lower aligned apertures 144 in the frame bracket 116 or more specifically the vertically extending bracket members 136, 140.

Once the attachment assembly 60 is secured to the A-frame member 36, each spring arm 56 may be positioned within a shoe bracket 112. To provide weight distribution and sway control, the spring arm 56 may be preloaded by bending the arm 56 upward, through the use of a jack or other such method, before the spring arm 56 is placed in the shoe bracket 112. When the spring arm 56 is positioned within the shoe bracket 112, the spring arm 56 may be generally in direct contact with the friction pad 132. The preload force may result in the spring arm 56 applying a downward force on the towed vehicle 24 through the attachment assembly 60 and an upward force on the rear of the towing vehicle 28 through the ball mount head 48. The magnitude of the preload force may be selected to enhance the effective operation of the towing vehicle 28 by considering factors such as, for example, the relative weights of the cargo and towed vehicle 24 and the anticipated driving conditions.

The downward force of the spring arm 56 may be relayed to the towed vehicle 24 by the contact of the spring arm 56 with the friction pad 132 coupled to the shoe bracket 112. Such downward force may assist in distributing weight of the towed vehicle 24 to the towing vehicle 28. The downward force, together with the friction coefficient of the friction pad 132 and the friction in the ball mount head 48 may produce a friction force that resists lateral and front-to-back movement of the spring arm 56 relative to the attachment assembly 60 and the towed vehicle 24. Such resistance may assist in controlling sway of the towed vehicle 24 relative to the towing vehicle 28.

The arrangement of the friction pad 132 and the friction in the ball mount head 48 may substantially improve the sway control of the towed vehicle 24 during towing of the towed vehicle 24. As mentioned earlier, the inclusion of a friction pad 132 may create a friction force to resist lateral and front-to-back movement of the spring arm 56 during towing of the towed vehicle 24. Such a force may be arranged such that the force does not interfere with the intended operations of the towing vehicle 28, such as controlled left and right turning, backing up, etc. The force, however, may dampen or counteract the sway forces encountered during driving of the towing vehicle 28 so as to reduce or eliminate the sway movement of the towed vehicle 24. This sway dampening may be as a result of friction at the second end 108 of the spring arm 56 and friction within the ball mount head 48. Because of high loads in the ball mount head 48, the frictional forces there may be four to five times higher than out at the second end 108 of the spring arm 56.

The hitch assembly 20 may allow for a user to selectively control the friction force applied to spring arm 56 and, thus, control the amount of sway control provided by the hitch assembly 20. By way of a non-limiting example, the preload force of the spring arm 56 may be increased, which may increase the sway control provided by the hitch assembly 20. Conversely, the preload force on the spring arm 56 may be decreased, which may decrease the sway control provided by the hitch assembly 20. Often, the conditions that demand a greater preload force on the spring arm 56 may also demand greater sway control. For example, as the weight of cargo increases, the preferred preload force on the spring arm 56 may increase to distribute more load to the front of the towing vehicle 28. Similarly, as the weight of cargo increases, the magnitudes of the sway forces may also increase; therefore, increases in sway control may be beneficial.

In the embodiments described and illustrated, when the preload force is increased, the downward force of the spring arm 56 on the friction pad 132 may increase as well as the forces in the ball mount head 48. The increased downward force may increase the friction force that must be overcome for the spring arm 56 to move laterally or front-to-back. This may provide greater control of sway by dampening and counteracting greater sway forces. The preload force may be increased or decreased in a number of ways. In some embodiments, the height of the shoe bracket 112 relative to the towed vehicle 24 may be adjusted based on specific aligned apertures 144, 148 of the frame bracket 116 and the side bracket 128, through which the shoe bracket 112 is attached. As may be seen in FIG. 1, there may be a plurality of aligned apertures 144, 148 through which the shoe bracket 112 may be attached. The higher the attachment of the shoe bracket 112, the greater the spring arm 56 must be bent upwards to be placed within the shoe bracket 112. This may result in greater preload force of the spring arm 56. Conversely, the lower the attachment of the shoe bracket 112, the less the spring arm 56 must be bent upwards to be placed within the shoe bracket 112. This may result in smaller preload force of the spring arm 56.

In other embodiments, the attachment assembly 60 may be selectively positioned along the length of the A-frame 36. As will be readily appreciated, as the attachment assembly 60 is moved towards the ball mount head 48 (i.e., closer to the first end 64 of the spring arm 56 and farther away from the second end 108 of the spring arm 56), the spring arm 56 may be bent upward a greater distance to be properly seated in the shoe bracket 112. The larger the upward deflection of the spring arm 56, the larger the sway control provided by the hitch assembly 20. Conversely, as the attachment assembly 60 may be moved away from the ball mount head 48 (i.e., closer to the second end 108 of the spring arm 56 and farther from the first end 64 of the spring arm 56), the spring arm 56 may be bent upward a lesser distance to be properly seated in the shoe bracket 112. The lesser the upward deflection of the spring arm 56, the lesser the sway control may be provided by the hitch assembly 20.

In other embodiments, the spring arms 56 may be selected based on the stiffness or rigidity of the material comprising the arms 56. As will be readily understood, at a given deflection, the preload force provided by the arms 56 may vary based on the stiffness or rigidity of the spring arm material. A spring arm comprised of a stiffer material may provide a greater preload force at a given deflection than a spring arm comprised of a more flexible or pliant material.

It will be readily understood that examples of apparatus, systems, and methods described and illustrated herein for increasing or decreasing sway control may also be applied to increase or decrease the distribution of the weight from a towed vehicle 24 to the towing vehicle 28.

As described above, the position of the attachment mechanism 60 along the A-frame member 36 may be variable, which may accommodate a variety of circumstances. The style of towed vehicle 24 and placement of cargo may limit the locations along the A-frame member 36 at which a hitch assembly may be coupled. For example, towed vehicles 24 designed to transport gas tanks often include securing fixtures along the perimeter of the towed vehicle 24. These securing fixtures and the placement of gas tanks in the fixtures often interfere with the placement of spring arm attachment mechanisms at locations along the A-frame. If the attachment mechanism is statically located along the spring arm, such a condition may preclude a hitch assembly from being used with a towed vehicle transporting gas tanks.

In the embodiments described and illustrated herein, the attachment assembly 60 may be secured anywhere along the A-frame member 36 and still accommodate the spring arm 56. When the spring arm 56 is placed on the friction pad 132, it may be free to move (once frictional forces between the friction pad 132 and the spring arm 56 are overcome) within an enclosure defined by the shoe bracket 112. Such placement of the spring arm 56 on the friction pad 132 may not be dependent on the location of the attachment assembly 60 to the A-frame member 36.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A weight distribution system comprising:
   a ball mount comprising:
     an upper member configured to have a hitch ball secured thereto;
     a lower engagement body;
   a spring arm operatively engaged with the lower engagement body, the lower engagement body comprising first and second plate members wherein the first plate member extends rearwardly further than the second plate member; and wherein the spring arm is operatively engaged between the first and second plate members of the ball mount, the spring arm directly loading on the first plate member creating a friction load in the ball mount dampening sway forces and wherein the spring arm is directly engaged with the second plate member; and
   a pin member securing the spring arm with the lower engagement body.

2. The weight distribution system of claim 1 wherein the pin pivotally attaches the spring arm with the lower engagement body.

3. The weight distribution system of claim 1, further comprising an attachment mechanism configured to selectively place the spring arm in mechanical communication with a towed vehicle wherein the spring arm is directly attached with the ball mount between the pair of plate members.

4. The weight distribution system of claim 1, wherein the spring arm being operatively engaged with the lower engagement body is free of a trunnion.

5. The weight distribution system of claim 1, wherein the spring arm being operatively engaged with the lower engagement body is free of a bushing.

6. The weight distribution system of claim 1, further comprising a clip securing the pin member with the spring arm and lower engagement body in a generally vertical position relative to the ball mount.

7. A weight distribution system comprising:
   a ball mount adapted to be mounted to a hitch of a towing vehicle, the ball mount comprising;
     an upper member capable of having a hitch ball secured thereto;
     a lower engagement body;
   a spring arm operatively engaged with the lower engagement body the lower engagement body comprising upper and lower plates, the upper plate extending a greater distance rearwardly than the lower plate the spring arm operatively inserted into the ball mount between the upper and lower plates, the spring arm directly loading on the upper plate creating a friction load in the ball mount dampening sway forces and wherein the spring arm is directly engaged with the lower plate member; and
   a pin inserted into the spring arm and the ball mount, the pin operatively securing the spring arm directly with the ball mount.

8. The weight distribution system of claim 7, wherein the spring arm is pivotally attached with the ball mount.

9. The weight distribution system of claim 7 further comprising an attachment mechanism configured to selectively place the spring arm in mechanical communication with a towed vehicle.

10. The weight distribution system of claim 9, wherein the attachment mechanism includes a shoe bracket engaging the spring arm with the towed vehicle.

11. The weight distribution system of claim 10, further comprising an engaging member selectively secured with the shoe bracket, the engaging member configured to circumscribe at least a portion of the spring arm.

12. The weight distribution system of claim 7, further comprising a clip, the clip selectively engaged with the pin member selectively securing the spring arm with the ball mount.

13. The weight distribution system of claim 7, wherein the spring arm being operatively engaged with the lower engagement body is free of a trunnion.

14. The weight distribution system of claim 7, wherein the spring arm being operatively engaged with the lower engagement body is free of a bushing.

15. A weight distribution system comprising:
   a ball mount adapted to be mounted to a hitch of a towing vehicle, the ball mount comprising an upper member and a lower engagement body, wherein the lower engagement body comprises first and second plate members;
   a spring arm operatively engaged between the first and second plate members of the lower engagement body, wherein the first plate member extends a greater distance rearwardly than the second plate member, the spring arm directly loading on the first plate member creating a friction load in the ball mount dampening sway forces and wherein the spring arm is directly engaged with the second plate member; and a pin inserted into the spring arm and the first and second plate members, the pin member operatively securing the spring arm with the ball mount.

16. The weight distribution system of claim 15, wherein the spring arm is pivotally attached between the first and second plate members.

17. The weight distribution system of claim 15, further comprising an attachment mechanism selectively placing the spring arm in mechanical communication with a towed vehicle.

18. The weight distribution system of claim 15, wherein the attachment mechanism comprises:

a shoe bracket engaging the spring arm with the towed vehicle; and an engaging member selectively secured with the shoe bracket, the engaging member configured to circumscribe at least a portion of the spring arm.

19. The weight distribution system of claim 18, wherein the spring arm is selectively in contact with a friction pad positioned in the shoe bracket.

20. The weight distribution system of claim 19, wherein the spring arm is in mechanical communication with the towed vehicle through a force applied to the friction pad by the spring arm.

* * * * *